United States Patent
Ishida

(10) Patent No.: US 10,602,021 B2
(45) Date of Patent: Mar. 24, 2020

(54) AUTHENTICATION SETTING SYSTEM AND IMAGE FORMING APPARATUS

(71) Applicant: KYOCERA Document Solutions Inc., Osaka (JP)

(72) Inventor: Takayuki Ishida, Osaka (JP)

(73) Assignee: Kyocera Document Solutions, Inc. (JP)

( * ) Notice: Subject to any disclaimer, the term of this patent is extended or adjusted under 35 U.S.C. 154(b) by 276 days.

(21) Appl. No.: 15/845,538

(22) Filed: Dec. 18, 2017

(65) Prior Publication Data

US 2018/0183978 A1     Jun. 28, 2018

(30) Foreign Application Priority Data

Dec. 22, 2016    (JP) .................................. 2016-248742

(51) Int. Cl.
*H04W 8/24*       (2009.01)
*H04N 1/44*       (2006.01)
(Continued)

(52) U.S. Cl.
CPC .......... *H04N 1/4413* (2013.01); *G06F 3/1222* (2013.01); *G06F 3/1238* (2013.01); *G06F 3/1292* (2013.01); *H04L 41/084* (2013.01); *H04L 63/0884* (2013.01); *H04W 4/50* (2018.02); *H04W 8/20* (2013.01); *H04W 8/205* (2013.01); *H04W 8/24* (2013.01); *H04W 12/0023* (2019.01); *H04W 12/06* (2013.01); *G06F 21/34* (2013.01); *H04L 41/0846* (2013.01); *H04L 63/10* (2013.01);
(Continued)

(58) Field of Classification Search
None
See application file for complete search history.

(56) References Cited

U.S. PATENT DOCUMENTS 8,312,514 B2 * 11/2012 Anderson ........... H04L 63/0442
                                            726/3
8,547,563 B2 * 10/2013 Ray ..................... H04N 1/00307
                                            358/1.13

(Continued)

FOREIGN PATENT DOCUMENTS

| JP | 2009-237930 | | 10/2009 |
|---|---|---|---|
| JP | 2013157848 A | * | 8/2013 |
| JP | 2014090345 A | * | 5/2014 |

*Primary Examiner* — Saleh Najjar
*Assistant Examiner* — Michael W Chao

(57) ABSTRACT

An image forming apparatus (a) causes the image scanning device to scan an image of: (a1) the mobile terminal apparatus before model changing that displays the subscriber ID, (a2) the mobile terminal apparatus after model changing that displays the subscriber ID, and (a3) a fill-in form in which the authentication setting information was written on a platen glass as one-time scanning and generate a scanned image, (b) extracts the subscriber IDs of the mobile terminal apparatuses and the authentication setting information, (c) causes the wireless communication device to transmit the authentication setting information to the mobile terminal apparatus after model changing if the subscriber ID of the mobile terminal apparatus before model changing and the subscriber ID of the mobile terminal apparatus after model changing are same as each other.

5 Claims, 5 Drawing Sheets

(51) Int. Cl.
*G06F 3/12* (2006.01)
*H04L 29/06* (2006.01)
*H04W 4/50* (2018.01)
*H04W 12/06* (2009.01)
*H04W 12/00* (2009.01)
*H04W 8/20* (2009.01)
*H04L 12/24* (2006.01)
*H04W 8/18* (2009.01)
*H04L 29/08* (2006.01)
*G06F 21/34* (2013.01)

(52) U.S. Cl.
CPC ........ *H04L 67/1095* (2013.01); *H04L 67/306* (2013.01); *H04N 2201/0094* (2013.01); *H04W 8/18* (2013.01); *H04W 12/00522* (2019.01)

(56) References Cited

U.S. PATENT DOCUMENTS

| | | | | |
|---|---|---|---|---|
| 8,621,025 | B2* | 12/2013 | Ridgard | H04L 67/1095 |
| | | | | 709/206 |
| 8,839,380 | B2* | 9/2014 | Kisters | G06F 21/32 |
| | | | | 726/5 |
| 9,084,284 | B1* | 7/2015 | Shipley | H04W 76/10 |
| 9,692,942 | B2* | 6/2017 | Osadchyy | H04N 1/444 |
| 9,930,199 | B1* | 3/2018 | Matsui | H04N 1/00827 |
| 10,015,651 | B1* | 7/2018 | Chauhan | H04L 69/14 |
| 10,223,048 | B2* | 3/2019 | Tonegawa | G06F 3/1238 |
| 2001/0041592 | A1* | 11/2001 | Suonpera | H04M 1/274516 |
| | | | | 455/557 |
| 2003/0065947 | A1* | 4/2003 | Song | H04L 63/08 |
| | | | | 726/23 |
| 2004/0125414 | A1* | 7/2004 | Ohishi | H04N 1/00222 |
| | | | | 358/402 |
| 2005/0209986 | A1* | 9/2005 | Pedersen | H04L 67/125 |
| 2005/0250522 | A1* | 11/2005 | Gilbert | H04M 1/274516 |
| | | | | 455/466 |
| 2006/0107063 | A1* | 5/2006 | Fiske | G06F 21/32 |
| | | | | 713/184 |
| 2006/0120518 | A1* | 6/2006 | Baudino | H04L 67/1095 |
| | | | | 379/91.02 |
| 2006/0128363 | A1* | 6/2006 | Cooling | G06F 11/1464 |
| | | | | 455/412.1 |
| 2007/0032225 | A1* | 2/2007 | Konicek | H04M 1/72513 |
| | | | | 455/417 |
| 2008/0082641 | A1* | 4/2008 | Meijer | G06Q 50/22 |
| | | | | 709/220 |
| 2009/0088142 | A1* | 4/2009 | Baribault | H04M 3/42 |
| | | | | 455/418 |
| 2009/0103124 | A1* | 4/2009 | Kimura | G06F 3/1204 |
| | | | | 358/1.15 |
| 2010/0317401 | A1* | 12/2010 | Lee | G06F 16/27 |
| | | | | 455/557 |
| 2011/0269424 | A1* | 11/2011 | Multer | H04L 67/1095 |
| | | | | 455/411 |
| 2013/0111009 | A1* | 5/2013 | Sng | H04W 28/0284 |
| | | | | 709/224 |
| 2015/0067099 | A1* | 3/2015 | Martin | H04L 67/10 |
| | | | | 709/217 |
| 2015/0067805 | A1* | 3/2015 | Martin | G06F 16/27 |
| | | | | 726/7 |
| 2015/0092233 | A1* | 4/2015 | Park | G06F 3/1288 |
| | | | | 358/1.15 |
| 2015/0138597 | A1* | 5/2015 | Koshigaya | H04N 1/00973 |
| | | | | 358/1.15 |
| 2016/0006745 | A1* | 1/2016 | Furuichi | G06F 21/31 |
| | | | | 726/28 |
| 2016/0063235 | A1* | 3/2016 | Tussy | G06F 21/32 |
| | | | | 726/6 |
| 2016/0255242 | A1* | 9/2016 | Osadchyy | H04N 1/444 |
| | | | | 358/1.14 |
| 2017/0340966 | A1* | 11/2017 | Quan | H04L 67/1095 |
| 2018/0352435 | A1* | 12/2018 | Donley | H04L 9/0872 |
| 2019/0124076 | A1* | 4/2019 | Zhang | H04L 63/18 |
| 2019/0174299 | A1* | 6/2019 | Ullah | H04W 8/24 |

* cited by examiner

FIG. 2
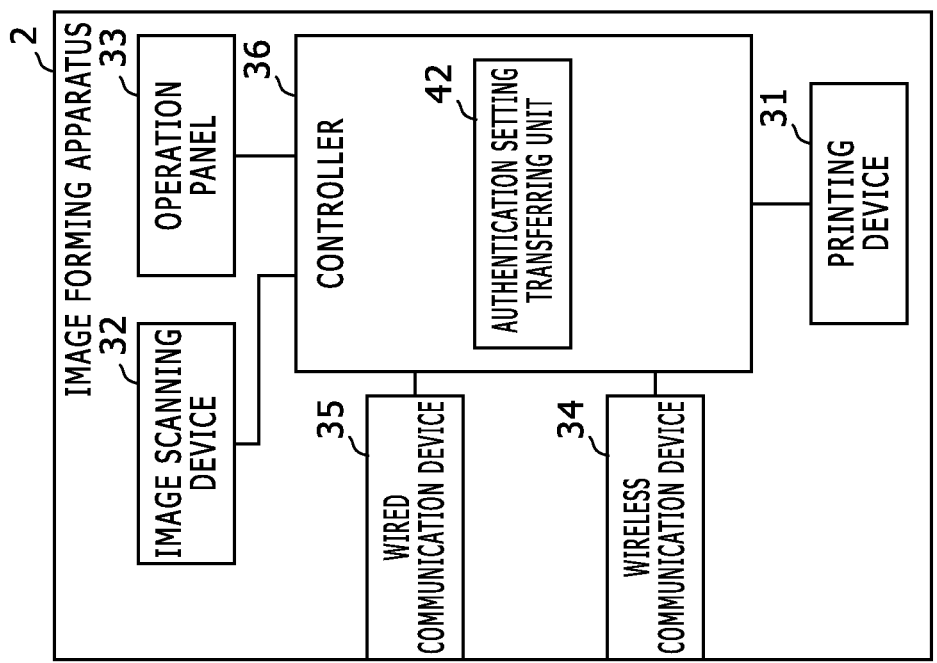
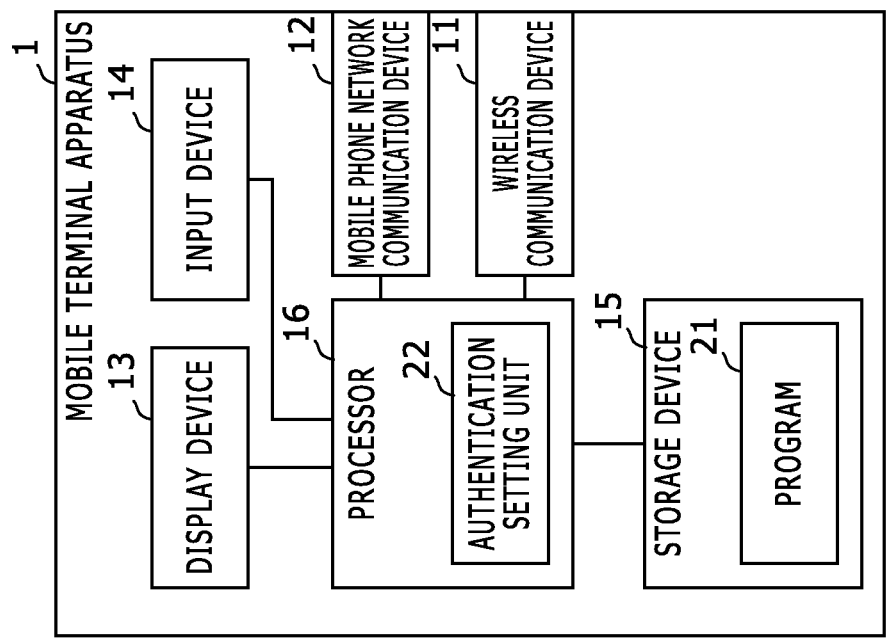

FILL-IN FORM

| # | APPLICATION | USER ID | PASSWORD |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |

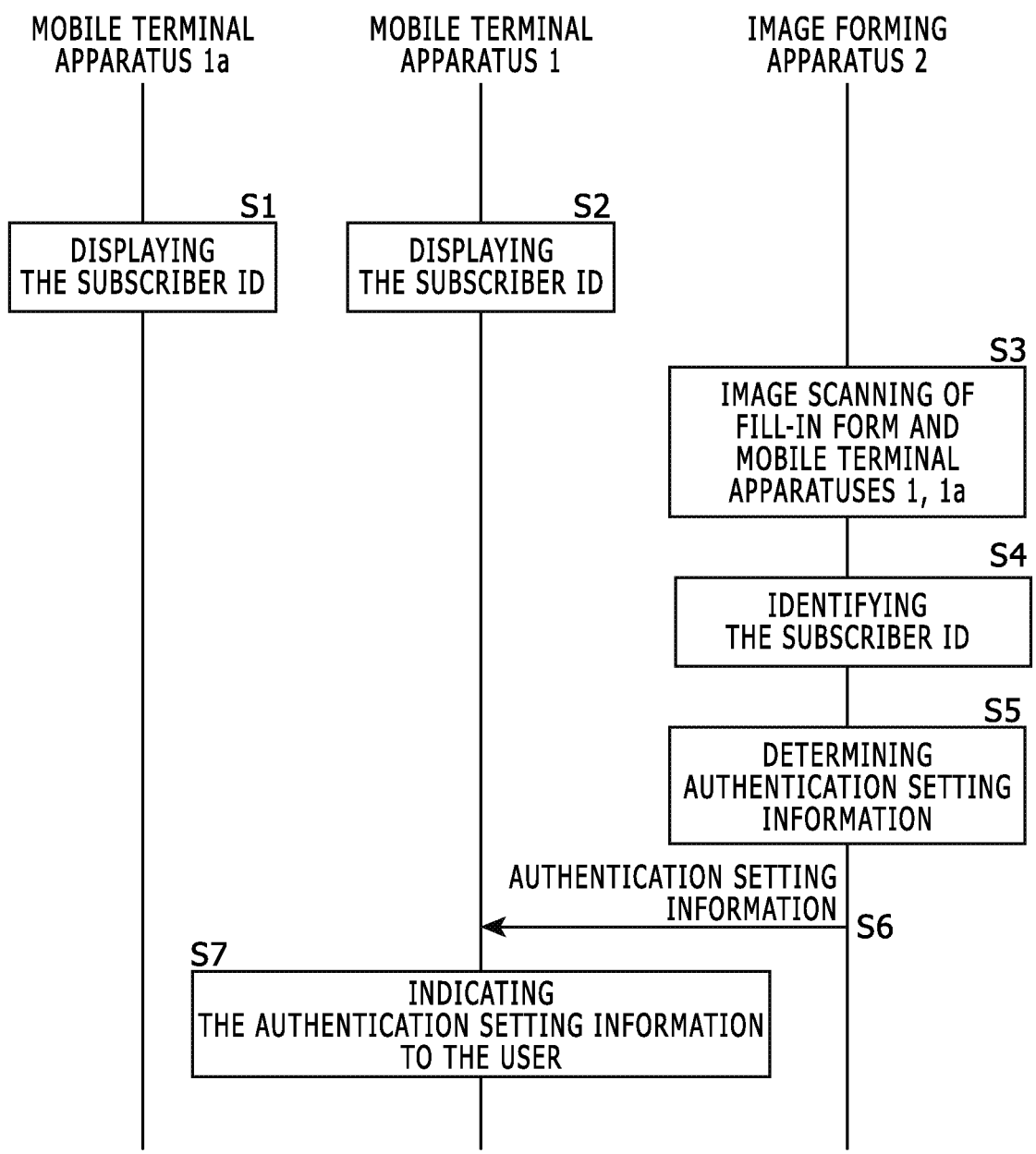

AUTHENTICATION SETTING SYSTEM AND IMAGE FORMING APPARATUS

CROSS-REFERENCE TO RELATED APPLICATIONS

This application relates to and claims priority rights from Japanese Patent Application No. 2016-248742, filed on Dec. 22, 2016, the entire disclosures of which are hereby incorporated by reference herein.

BACKGROUND

1. Field of the Present Disclosure

The present disclosure relates to an authentication setting system and an image forming apparatus.

2. Description of the Related Art

At model changing of a mobile terminal apparatus, (a) when an external memory is connected to a mobile terminal apparatus before model changing, a system moves an application file, an application data file, an application definition file and the like from the mobile terminal apparatus before model changing to the external memory, and (b) when the external memory is connected to a mobile terminal apparatus after model changing, the system moves the application file, the application data file, the application definition file and the like from the external memory to the mobile terminal apparatus after model changing.

However, for example, at model changing, when using an external memory, authentication setting information such as user ID and password is transferred from a mobile terminal device before model changing to a mobile terminal device after model changing as mentioned, the authentication setting information may be transferred to another wrong mobile terminal apparatus in error due to portability of the external memory in which the authentication setting information is memorized, and thus that is not favorable for information security.

SUMMARY

An authentication setting system according to an aspect of the present disclosure provides authentication setting information for an application set in a mobile terminal apparatus before model changing to a mobile terminal apparatus after model changing, and the authentication setting system includes a mobile terminal apparatus before model changing, a mobile terminal apparatus after model changing, and an image forming apparatus. The mobile terminal apparatus before model changing is configured to display a subscriber ID provided from a carrier. The mobile terminal apparatus after model changing is configured to display a subscriber ID provided from a carrier. The image forming apparatus includes an image scanning device and a wireless communication device. The image forming apparatus (a) causes the image scanning device to scan an image of: (a1) the mobile terminal apparatus before model changing that displays the subscriber ID, (a2) the mobile terminal apparatus after model changing that displays the subscriber ID, and (a3) a fill-in form in which the authentication setting information was written that are put on a platen glass as one-time scanning and generate a scanned image, (b) extracts the subscriber ID of the mobile terminal apparatus before model changing, the subscriber ID of the mobile terminal apparatus after model changing, and the authentication setting information, (c) causes the wireless communication device to transmit the authentication setting information to the mobile terminal apparatus after model changing if the subscriber ID of the mobile terminal apparatus before model changing and the subscriber ID of the mobile terminal apparatus after model changing are same as each other, and does not cause the wireless communication device to transmit the authentication setting information to the mobile terminal apparatus after model changing if the subscriber ID of the mobile terminal apparatus before model changing and the subscriber ID of the mobile terminal apparatus after model changing are not same as each other.

An image forming apparatus according to an aspect of the present disclosure provides authentication setting information for an application set in a mobile terminal apparatus before model changing to a mobile terminal apparatus after model changing, and the image forming apparatus includes an image scanning device, a wireless communication device, and an authentication setting transferring unit. The image scanning device scans an image of: (a1) the mobile terminal apparatus before model changing that displays the subscriber ID, (a2) the mobile terminal apparatus after model changing that displays the subscriber ID, and (a3) a fill-in form in which the authentication setting information was written that are put on a platen glass as one-time scanning and generates a scanned image. The authentication setting transferring unit (b) extracts the subscriber ID of the mobile terminal apparatus before model changing, the subscriber ID of the mobile terminal apparatus after model changing, and the authentication setting information, (c) causes the wireless communication device to transmit the authentication setting information to the mobile terminal apparatus after model changing if the subscriber ID of the mobile terminal apparatus before model changing and the subscriber ID of the mobile terminal apparatus after model changing are same as each other, and does not cause the wireless communication device to transmit the authentication setting information to the mobile terminal apparatus after model changing if the subscriber ID of the mobile terminal apparatus before model changing and the subscriber ID of the mobile terminal apparatus after model changing are not same as each other.

These and other objects, features and advantages of the present disclosure will become more apparent upon reading of the following detailed description along with the accompanied drawings.

BRIEF DESCRIPTION OF THE DRAWINGS

FIG. 2 shows a block diagram that indicates a configuration of a mobile terminal apparatus 1 and an image forming apparatus 2 shown in FIG. 1;

FIG. 3 shows a diagram that indicates a fill-in form;

FIG. 5 shows a sequence diagram that explains a behavior of the authentication setting system shown in FIGS. 1 and 2.

DETAILED DESCRIPTION

Hereinafter, an embodiment according to an aspect of the present disclosure will be explained with reference to drawings.

Figure 1:
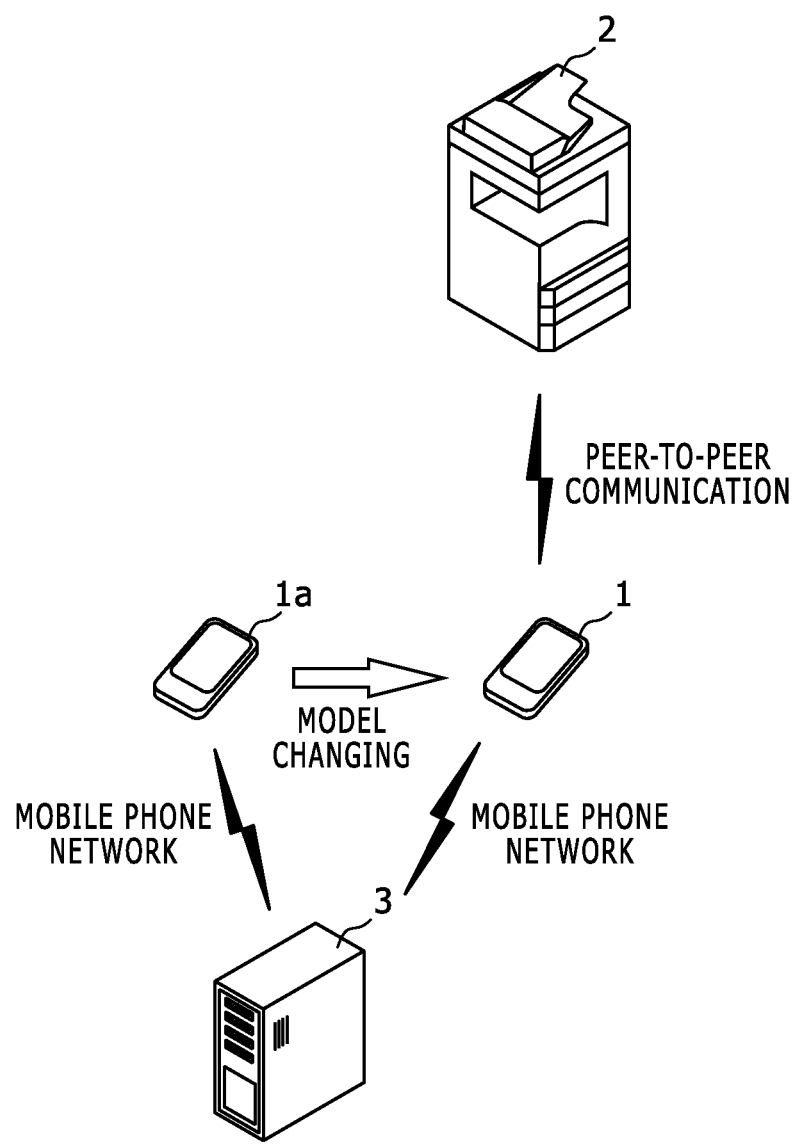
FIG. 1 shows a diagram that indicates a configuration of an authentication setting system according to an embodiment of the present disclosure.

FIG. 1 shows a diagram that indicates a configuration of an authentication setting system according to an embodiment of the present disclosure. This authentication setting system is used to input authentication setting information (user ID and password, or the like) for an application to a mobile terminal apparatus after model changing at the model changing of a mobile terminal apparatus (a mobile phone, a smart phone or the like) capable of using a mobile phone network of a specific communication carrier. The model changing means changing a device to which an ID such as telephone number is assigned on the basis of a contract with the communication carrier.

In the system shown in FIG. 1, the mobile terminal apparatus 1 is a mobile terminal apparatus after model changing, and the mobile terminal apparatus 1a is a mobile terminal apparatus before model changing. In both of the mobile terminal apparatuses 1 and 1a, sorts of applications are installed and the applications require authentication setting information (user ID and password, or the like) of a user when using the applications. The image forming apparatus 2 (such as a multi function peripheral, a copier, a facsimile device or the like) is located at a shop of the communication carrier or its agent, and using the image forming apparatus 2, such authentication setting information for such an application is provided to the mobile terminal apparatus after model changing. Thus, the image forming apparatus 2 provides such authentication setting information for such an application set in the mobile terminal apparatus 1a (i.e. the mobile terminal apparatus before model changing) to the mobile terminal apparatus 1 (i.e. the mobile terminal apparatus after model changing).

Further, at model changing, a carrier server 3 of the communication carrier assigns to the mobile terminal apparatus 1 a subscriber ID (i.e. a telephone number, a user ID provided by the communication carrier or the like) as same as the subscriber ID of the mobile terminal apparatus 1a.

In the system shown in FIG. 1, the mobile terminal apparatus 1 is capable of data communication with the image forming apparatus 2 through a predetermined peer-to-peer communication method such as Wi-Fi Direct (registered trademark) or Bluetooth (registered trademark). Contrarily, the mobile terminal apparatus 1a is not capable of data communication with the image forming apparatus 2 through this predetermined peer-to-peer communication method. Consequently, using this peer-to-peer communication method, the image forming apparatus 2 selects the mobile terminal apparatus 1 (i.e. the mobile terminal apparatus after model changing) among the mobile terminal apparatuses 1 and 1a, and performs data communication with the selected mobile terminal apparatus 1.

FIG. 2 shows a block diagram that indicates a configuration of a mobile terminal apparatus 1 and an image forming apparatus 2 shown in FIG. 1. A configuration of the mobile terminal apparatus 1a is the same as the configuration of the mobile terminal apparatus 1.

The mobile terminal apparatus 1 is, for example, a portable device such as a smartphone, and includes a wireless communication device 11, a mobile phone network communication device 12, a display device 13, an input device 14, a storage device 15, a processor 16 and the like.

The wireless communication device 11 is an internal device that performs data communication according to a predetermined wireless communication standard such as wireless LAN (Local Area Network) or Bluetooth (registered trademark). The aforementioned wireless communication according to peer-to-peer communication method is performed by the wireless communication device 11.

The mobile phone network communication device 12 is a wireless communication device capable of connecting to a mobile phone network, and performs data communication and voice communication.

The display device 13 is an internal device such as a liquid crystal display, that displays an operation screen and the like for a user. The input device 14 is an internal device such as a touch panel, that detects a user operation.

The storage device 15 is a nonvolatile storage device such as a flash memory or a hard disk. In the storage device 15, a program 21 and the like are stored.

The processor 16 is a computer that includes a CPU (Central Processing Unit), a RAM (Random Access Memory), a ROM (Read Only Memory) and the like, and loads the program 21 to the RAM and executes the program 21 using the CPU, and thereby acts as an authentication setting unit 22.

The authentication setting unit 22 of the mobile terminal apparatus 1 displays a subscriber ID associated with this mobile terminal apparatus 1 on the display device 13, and receives authentication setting information (a user ID and a password of an application) from the image forming apparatus 2 according to the aforementioned peer-to-peer communication method using the wireless communication device 11.

Further, the authentication setting unit 22 of the mobile terminal apparatus 1 displays the received authentication setting information as an input candidate so as to associate the received authentication setting information with an input field (e.g. input fields of a user ID and a password in a registration screen of authentication setting information) for inputting authentication setting information in the corresponding application on the basis of the received authentication setting information. For example, the authentication setting information is displayed as an input candidate so as to be adjacent to the input field or is displayed as an input candidate in a pulldown menu of the input field.

Alternatively, the authentication setting unit 22 of the mobile terminal apparatus 1 automatically displays the received authentication setting information as an input candidate in an input field for inputting authentication setting information in the corresponding application on the basis of the received authentication setting information.

Further, if possible, the authentication setting unit may automatically apply the received authentication setting information to the corresponding application or may simply display the received authentication setting information as a list to a user.

It should be noted that the authentication setting unit 22 of the mobile terminal apparatus 1a displays a subscriber ID associated with this mobile terminal apparatus 1a, but does not receive the authentication setting information because the mobile terminal apparatus 1a is not capable of wireless communication according to the aforementioned peer-to-peer communication method with the image forming apparatus 2.

Meanwhile, in FIG. 2, the image forming apparatus 2 is a multi function peripheral or the like used by registered plural users, and includes a printing device 31, an image scanning device 32, an operation panel 33, a wireless communication device 34, a wired communication device 35, and a controller 36.

The printing device 31 is an internal device that performs printing an image on a printing paper sheet in an electrographic manner page by page on the basis of printing image data.

The image scanning device 32 is an internal device that optically scans an image of a physical object on a platen glass and generates image data of the scanned image.

The operation panel 33 is arranged on a surface of a housing of the image forming apparatus 2, and includes a display device that displays sorts of information to a user and an input device that detects a user operation. For example, a liquid crystal display is used as the display device. A key switch, a touch panel or the like is used as the input device.

The wireless communication device 34 is an internal device that performs data communication according to a predetermined wireless communication standard such as wireless LAN or Bluetooth (registered trademark). The aforementioned wireless communication according to peer-to-peer communication method is performed by the wireless communication device 34.

The wired communication device 35 is an electronic circuit connected to a network such as a wired LAN or the like, and performs data communication with another apparatus connected to the network.

Further, the controller 36 includes a computer, an ASIC (Application Specific Integrated Circuit) and/or the like, and controls internal devices in the image forming apparatus 2 and performs sorts of data processing. The controller 36 acts as an authentication setting transferring unit 42.

FIG. 3 shows a diagram that indicates a fill-in form. For example, a fill-in form 101 is prepared as shown in FIG. 3. The fill-in form 101 includes entry columns of a name of an application and a user ID and a password of this application. When model changing is conducted, such a fill-in form 101 is provided to a user of the mobile terminal apparatuses 1 and 1a, and the user of the mobile terminal apparatuses 1 and 1a fills in the form 101 with a name of the application, a user ID, and a password for each application.

Figure 4:
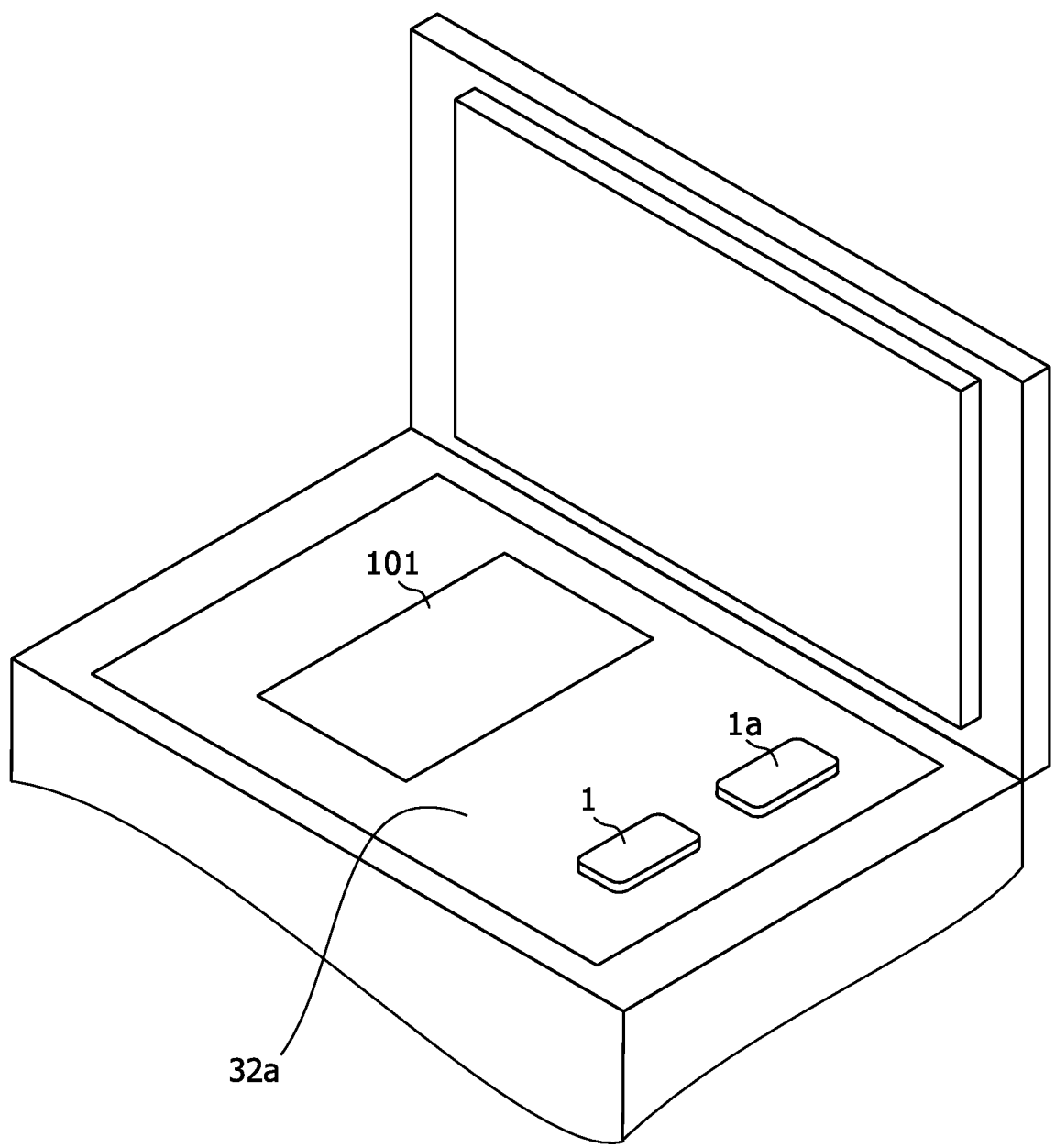
FIG. 4 shows a perspective diagram that indicates an example of the mobile terminal apparatuses 1 and 1a put on a image scanning device 32 shown in FIG. 1.

FIG. 4 shows a perspective diagram that indicates an example of the mobile terminal apparatuses 1 and 1a put on an image scanning device 32 shown in FIG. 1.

While the mobile terminal apparatus 1a before model changing displays a subscriber ID provided from a carrier and the mobile terminal apparatus 1 after model changing displays a subscriber ID provided from a carrier, as one-time scanning, the image scanning device 32 scans (a) the mobile terminal apparatus 1a, (b) the mobile terminal apparatus 1 and (c) the fill-in form 101 in which the authentication setting information was written in, put on the platen glass as shown in FIG. 4, and thereby generates a scanned image.

The authentication setting units 22 of the mobile terminal apparatus 1 and the mobile terminal apparatus 1a display specific screens that include own subscriber IDs on the display devices 13 in accordance with user operations to the input devices 14, respectively. In such conditions, the user turns the display screens downwardly and puts the mobile terminal apparatus 1 and the mobile terminal apparatus 1a on the platen glass 32a. Consequently, the scanned image obtained by the image scanning device 32 includes not only an image of the authentication setting information written in the fill-in form 101 but images of the subscriber IDs of them.

The authentication setting units 22 of the mobile terminal apparatuses 1 and 1a may display as the subscriber IDs specific screens that include visible codes that indicate the subscriber IDs (such as QR codes (registered trademark) generated by encoding the subscriber IDs respectively) on the display devices 13, and the image forming apparatus 2 may detect the visible codes in the scanned image and decode the visible codes and thereby identify the subscriber IDs.

The authentication setting transferring unit 42 (a) extracts the subscriber ID of the mobile terminal apparatus 1a before model changing, the subscriber ID of the mobile terminal apparatus 1 after model changing, and the authentication setting information. If the subscriber ID of the mobile terminal apparatus before model changing and the subscriber ID of the mobile terminal apparatus after model changing are same as each other, then the authentication setting transferring unit 42 causes the wireless communication device 34 to transmit the authentication setting information to the mobile terminal apparatus 1 after model changing in accordance with the aforementioned peer-to-peer communication method.

If the fill-in form 101 is of a hand writing type as shown in FIG. 3, then the name, the user ID and the password written in the form 101 are determined using an OCR (Optical Character Recognition) technique, for example. Further, the fill-in form 101 may be of a marksheet type, and in such a case, the name, the user ID and the password written in the form 101 are determined on the basis of positions and pattern of marks written by a user.

The following part explains a behavior of the aforementioned authentication setting system. FIG. 5 shows a sequence diagram that explains a behavior of the authentication setting system shown in FIGS. 1 and 2.

Firstly, an operator of a carrier (e.g. sales person of a shop or the like) provides a fill-in form 101 to a user of the mobile terminal apparatuses 1 and 1a, asks the user to fill in the fill-in form 101 with authentication setting information of an application installed in the mobile terminal apparatus 1a, and collects the fill-in form 101 in which the authentication setting information of such application was written. Further, the operator or the user operates the mobile terminal apparatuses 1 and 1a and thereby causes the mobile terminal apparatuses 1 and 1a to display subscriber IDs, respectively (in Steps S1 and S2).

Subsequently, the operator puts the fill-in form 101, the mobile terminal apparatus 1a before model changing, and the mobile terminal apparatus 1 after model changing on the platen glass 32a, and performs a predetermined operation to the image forming apparatus 2.

When the operation is detected by the operation panel 33, the authentication setting transferring unit 42 of the image forming apparatus 2 causes the image scanning device 32 to perform image scan of the fill-in form 101, the mobile terminal apparatus 1a before model changing, and the mobile terminal apparatus 1 after model changing on the platen glass 32a, and thereby obtains the scanned image.

Subsequently, the authentication setting transferring unit 42 extracts the subscriber ID of the mobile terminal apparatus 1a before model changing and the subscriber ID of the mobile terminal apparatus 1 after model changing, and determines whether both of the subscriber IDs are same as each other or not (in Step S4).

If both of the subscriber IDs are same, then the authentication setting transferring unit 42 determines the authentication setting information (a user ID and a password) of each application written in the fill-in form 101 (in Step S5), and causes the wireless communication device 34 to transmit the authentication setting information to the mobile terminal apparatus 1 after model changing that owns the extracted subscriber ID (in Step S6). Otherwise, if both of the subscriber IDs are not same, then the authentication setting transferring unit 42 does not perform transmission of the authentication setting information by wireless communication according to the peer-to-peer communication method.

When receiving the authentication setting information, the mobile terminal apparatus 1 after model changing stores the received authentication setting information in the storage device 15, and shows the stored authentication setting information to the user at timing when the user registers authentication setting information of the application into the mobile terminal apparatus 1 after model changing as mentioned (in Step S7). By using the shown authentication setting information, the user can easily input authentication setting information to the mobile terminal apparatus 1 after model changing.

In the aforementioned embodiment, the image scanning device 32 of the image forming apparatus 2 scans an image of: (a1) the mobile terminal apparatus 1*a* before model changing that displays the subscriber ID, (a2) the mobile terminal apparatus 1 after model changing that displays the subscriber ID, and (a3) the fill-in form 101 in which the authentication setting information was written that are put on a platen glass as one-time scanning and generates a scanned image. The authentication setting transferring unit 42 of the image forming apparatus 2 (b) extracts the subscriber ID of the mobile terminal apparatus 1*a* before model changing, the subscriber ID of the mobile terminal apparatus 1 after model changing, and the authentication setting information, (c) causes the wireless communication device 34 to transmit the authentication setting information to the mobile terminal apparatus 1 after model changing if the subscriber ID of the mobile terminal apparatus 1*a* before model changing and the subscriber ID of the mobile terminal apparatus 1 after model changing are same as each other.

Consequently, the authentication setting information that has been set in the mobile terminal apparatus 1*a* before model changing is surely provided to mobile terminal apparatus 1 after model changing corresponding to the mobile terminal apparatus 1*a* before model changing. Therefore, if the subscriber ID of the mobile terminal apparatus 1*a* before model changing and the subscriber ID of the mobile terminal apparatus 1 after model changing are not same as each other, then the authentication setting information is not transmitted, and consequently, it does not occur that the authentication setting information is transmitted to another mobile terminal apparatus in error.

In addition, a manual operation is reduced of a carrier operator for inputting a setting to the mobile terminal apparatus 1 after model changing, and consequently, the time required for model changing is shortened.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, the authentication setting transferring unit 42 of the image forming apparatus 2 may remove the extracted authentication setting information when the wireless communication device 34 disconnects from the mobile terminal device 1 after model changing (i.e. disconnection of the peer-to-peer communication). Consequently, the authentication setting information is automatically removed and therefore it is favorable for information security.

What is claimed is:

1. An authentication setting system that provides authentication setting information for an application set in a mobile terminal apparatus before model changing to a mobile terminal apparatus after model changing, comprising:

a mobile terminal apparatus before model changing configured to display a subscriber ID provided from a carrier;

a mobile terminal apparatus after model changing configured to display a subscriber ID provided from a carrier; and an image forming apparatus that comprises an image scanning device and a wireless communication device;

wherein the image forming apparatus (a) causes the image scanning device to scan an image of: (a1) the mobile terminal apparatus before model changing that displays the subscriber ID, (a2) the mobile terminal apparatus after model changing that displays the subscriber ID, and (a3) a fill-in form in which the authentication setting information was written that are put on a platen glass as one-time scanning and generate a scanned image, (b) extracts the subscriber ID of the mobile terminal apparatus before model changing, the subscriber ID of the mobile terminal apparatus after model changing, and the authentication setting information, (c) causes the wireless communication device to transmit the authentication setting information to the mobile terminal apparatus after model changing if the subscriber ID of the mobile terminal apparatus before model changing and the subscriber ID of the mobile terminal apparatus after model changing are same as each other, and does not cause the wireless communication device to transmit the authentication setting information to the mobile terminal apparatus after model changing if the subscriber ID of the mobile terminal apparatus before model changing and the subscriber ID of the mobile terminal apparatus after model changing are not same as each other.

2. The authentication setting system according to claim 1, wherein the mobile terminal apparatus after model changing receives the authentication setting information, and displays the received authentication setting information as an input candidate so as to associate the received authentication setting information with an input field for inputting authentication setting information in the application.

3. The authentication setting system according to claim 1, wherein the mobile terminal apparatus after model changing receives the authentication setting information, and automatically displays the received authentication setting information as an input candidate in an input field for inputting authentication setting information in the application.

4. The authentication setting system according to claim 1, wherein the mobile terminal apparatus after model changing is capable of data communication with the wireless communication device through a predetermined peer-to-peer communication method;

the mobile terminal apparatus before model changing is not capable of data communication with the wireless communication device through the predetermined peer-to-peer communication method;

the wireless communication device transmits the authentication setting information to the mobile terminal apparatus after model changing through the predetermined peer-to-peer communication method; and the image forming apparatus removes the extracted authentication setting information when the wireless communication device disconnects from the mobile terminal device after model changing.

5. An image forming apparatus that provides authentication setting information for an application set in a mobile terminal apparatus before model changing to a mobile terminal apparatus after model changing, comprising:

an image scanning device;
a wireless communication device; and
an authentication setting transferring unit;
wherein the image scanning device scans an image of:
(a1) the mobile terminal apparatus before model changing that displays the subscriber ID, (a2) the mobile terminal apparatus after model changing that displays the subscriber ID, and (a3) a fill-in form in which the authentication setting information was written that are put on a platen glass as one-time scanning and generates a scanned image, and
the authentication setting transferring unit (b) extracts the subscriber ID of the mobile terminal apparatus before model changing, the subscriber ID of the mobile terminal apparatus after model changing, and the authentication setting information, (c) causes the wireless communication device to transmit the authentication setting information to the mobile terminal apparatus after model changing if the subscriber ID of the mobile terminal apparatus before model changing and the subscriber ID of the mobile terminal apparatus after model changing are same as each other, and does not cause the wireless communication device to transmit the authentication setting information to the mobile terminal apparatus after model changing if the subscriber ID of the mobile terminal apparatus before model changing and the subscriber ID of the mobile terminal apparatus after model changing are not same as each other.

\* \* \* \* \*